(12) United States Patent
Potti et al.

(10) Patent No.: US 12,265,805 B2
(45) Date of Patent: Apr. 1, 2025

(54) SYNTACTICALLY COHERENT CODE SEGMENTATION

(71) Applicant: GOOGLE LLC, Mountain View, CA (US)

(72) Inventors: Navneet Potti, Sunnyvale, CA (US); Joshua Howland, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 25 days.

(21) Appl. No.: 18/102,039

(22) Filed: Jan. 26, 2023

(65) Prior Publication Data

US 2024/0256235 A1  Aug. 1, 2024

(51) Int. Cl.
G06F 9/44 (2018.01)
G06F 8/41 (2018.01)

(52) U.S. Cl.
CPC .............. *G06F 8/433* (2013.01); *G06F 8/425* (2013.01); *G06F 8/427* (2013.01)

(58) Field of Classification Search
CPC ............ G06F 8/433; G06F 8/425; G06F 8/427
USPC .......................................................... 717/120
See application file for complete search history.

(56) References Cited

U.S. PATENT DOCUMENTS

| | | | |
|---|---|---|---|
| 2020/0264852 A1* | 8/2020 | Craymer, III | G06F 8/447 |
| 2023/0176838 A1* | 6/2023 | Bronevetsky | G06F 8/71 717/110 |

OTHER PUBLICATIONS

"Interval Tree" Wikipedia. Retrieved from https://en.wikipedia.org/w/index.php?title=Interval_tree&oldid=1122891003, 9 pages.
Dwivedi et al., "A Generalization of Transformer Networks to Graphs" arXiv:2012.09699v2 [cs.LG] 8 pages, dated Jan. 24, 2021.
Sharma et al., "A Survey on Machine Learning Techniques for Source Code Analysis" arXiv:2110.09610v2 [cs.SE] 73 pages, dated Sep. 13, 2022.

\* cited by examiner

*Primary Examiner* — Chuck O Kendall
(74) *Attorney, Agent, or Firm* — Gray Ice Higdon

(57) ABSTRACT

Techniques are described herein for segmenting source code into syntactically coherent sequences of tokens that satisfy constraints inherent in sequence-to-sequence networks. In various implementations, source code may be processed to generate one or more graphs representing the source code. One or more of the graphs may then be traversed to identify one or more sequences of tokens within the source code that satisfy an input constraint of a sequence-to-sequence network. The source code may be segmented into the identified one or more sequences of tokens. The one or more sequences of tokens may then be processed using the sequence-to-sequence network.

18 Claims, 5 Drawing Sheets

SYNTACTICALLY COHERENT CODE SEGMENTATION

BACKGROUND

Computer software programming often requires developers to read and/or write source code (i.e., to program) in a specific programming language, e.g. Java, C++, C, Python, etc. Each programming language has its own strengths, weaknesses, nuances, idiosyncrasies, etc. Additionally, some programming languages are more suitable for certain stages of software development and/or a software life cycle than others. As one example, scripting languages such as Python, JavaScript, Perl, etc., are often more effectively used near the very beginning of software development because programmers using these languages are able to turn around functional software relatively quickly. Most programmers obtain at least a superficial understanding of multiple programming languages, but only master a few. Consequently, each programming language tends to have its own talent pool.

Various types of sequence-to-sequence networks, such as transformer networks, have become increasingly popular for performing sequence-to-sequence prediction tasks such as natural language processing, translation, summarization, etc. Transformer networks, for instance, were designed in part to mitigate a variety of shortcomings of prior sequence-to-sequence networks, such as overfitting, the vanishing gradient problem, and exceedingly high computational costs, to name a few.

Various sequence-to-sequence networks are designed to process a fixed number of tokens during each invocation. For instance, some transformer networks are designed to process 512 tokens at a time. While being limited to processing a fixed number of tokens may not pose a significant problem for sequence-to-sequence prediction in the natural language domain, it may negatively impact prediction in other domains that impose more significant syntactic constraints. For instance, programming languages tend to have strict rules, grammars, idioms, etc. Failing to account for these syntactic constraints while segmenting source code during training may result in a sequence-to-sequence network being fitted to syntactically incoherent source code, and hence, being prone to syntactically incoherent prediction.

SUMMARY

Implementations are described herein for segmenting source code into syntactically coherent sequences of tokens that satisfy constraints inherent in sequence-to-sequence networks. More particularly, but not exclusively, implementations are described herein for leveraging graphs representative of source code tokens, as well as logic that connects those tokens—such as abstract syntax trees (ASTs) or control flow graphs (CFGs)—to identify sequences of tokens that satisfy input constraints of sequence-to-sequence networks, such as transformer networks. These identified sequences of tokens may then be processed as inputs to the sequence-to-sequence models for various purposes, such as training the sequence-to-sequence models, translating between programming languages (or different versions of the same programming language), performing large scale source code migrations, etc.

In some implementations, a method may be implemented by one or more processors and may include: processing source code to generate one or more graphs representing the source code; traversing one or more of the graphs to identify one or more sequences of tokens within the source code that satisfy an input constraint of a sequence-to-sequence network; segmenting the source code into the identified one or more sequences of tokens; and processing the one or more sequences of tokens using the sequence-to-sequence network.

In various implementations, the one or more graphs may include an abstract syntax tree (AST) representing the source code. a data flow graph (DFG) and/or a control flow graph (CFG) representing the source code. In various implementations, the sequence-to-sequence model comprises a transformer network.

In various implementations, traversing one or more of the graphs to identify the one or more sequences of tokens may include: determining a count of tokens represented by a node of one or more of the graphs; and comparing the count of tokens to the input constraint of the sequence-to-sequence network. In various implementations, determining the count may include: identifying a portion of the source code represented by the node; and consulting an interval tree based on the identified portion of the source code to determine the count.

In various implementations, the node may be a first node, the count may be a first count, and the method may include: in response to a determination that the first count of tokens satisfies the input constraint of the sequence-to-sequence network, determining a second count of tokens represented by a second node of one or more of the graphs, and comparing the second count of tokens to the input constraint of the sequence-to-sequence network. In various implementations, the second node may be a sibling node of the first node.

In various implementations, the node may be a first node, the count may be a first count, and the method may include: in response to a determination that the first count of tokens fails to satisfy the input constraint of the sequence-to-sequence network, determining a second count of tokens represented by a child node of the first node, and comparing the second count of tokens to the input constraint of the sequence-to-sequence network.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
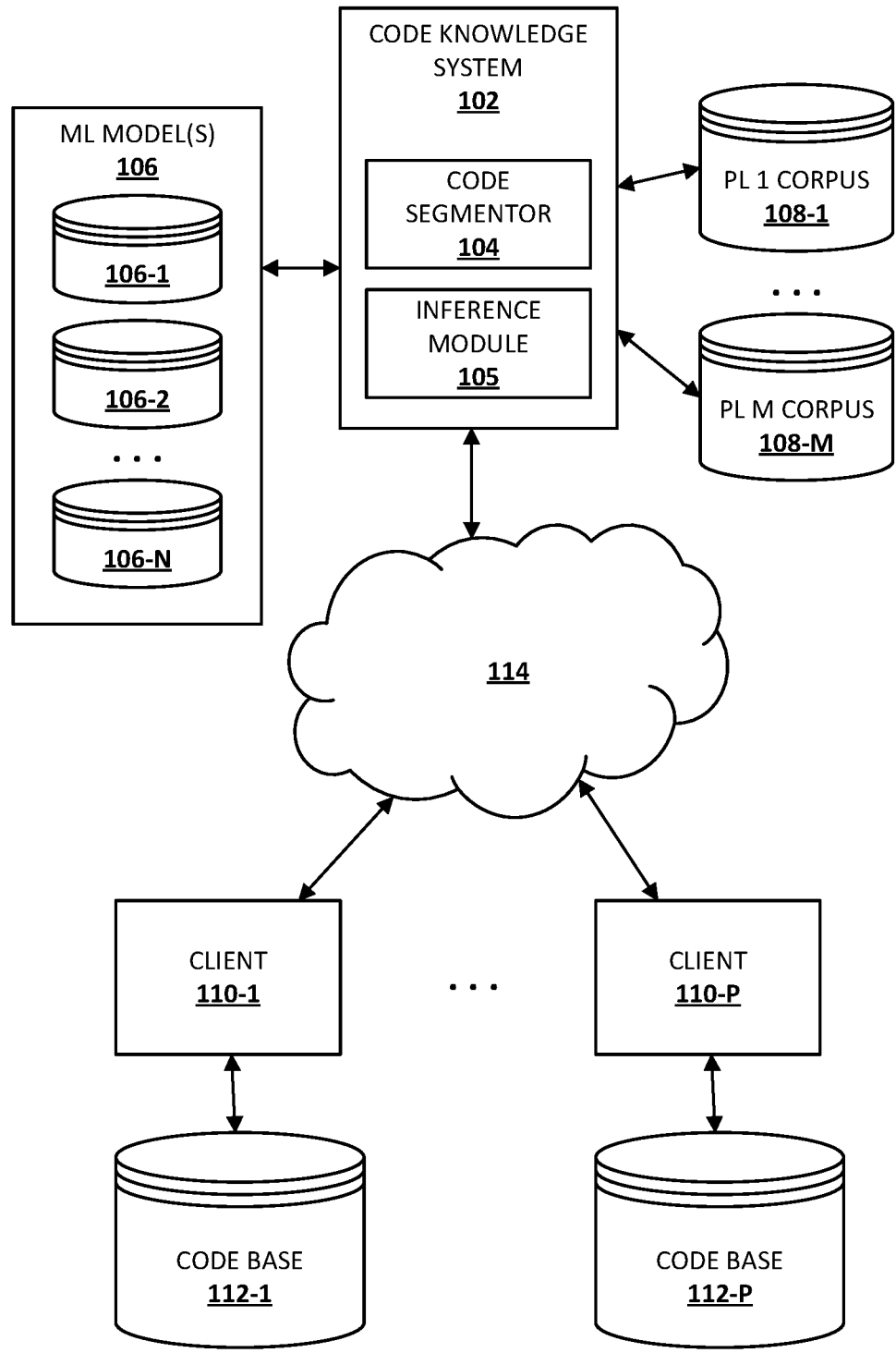
FIG. 1 schematically depicts an example environment in which selected aspects of the present disclosure may be implemented, in accordance with various implementations.

Implementations are described herein for segmenting source code into syntactically coherent sequences of tokens that satisfy constraints inherent in sequence-to-sequence networks. More particularly, but not exclusively, implementations are described herein for leveraging graphs representative of source code tokens, as well as logic that connects those tokens—such as abstract syntax trees (ASTs) or control flow graphs (CFGs)—to identify sequences of tokens that satisfy input constraints of sequence-to-sequence networks, such as transformer networks. These identified sequences of tokens may then be processed as inputs to the sequence-to-sequence models for various purposes, such as training the sequence-to-sequence models, translating between programming languages (or different versions of the same programming language), performing large scale source code migrations, etc.

In various implementations, source code that is to be processed using a sequence-to-sequence network, e.g., for translation to a different programming language, identification/remediation of errors/bugs, conversion to a particular programming style, natural language summarization of source code, etc., may be used to generate a graph such as an AST or CFG. The graph may then be traversed to identify syntactically coherent sequences of tokens within the source code that satisfy constraint(s) of a sequence-to-sequence network. For example, many transformer networks are designed to process 512 tokens at a time. These transformer networks may or may not include mechanisms for propagating data between different iterations of the sequence-to-sequence network (e.g., "memory").

Sequences of tokens that satisfy these constraints may be identified in various ways. In some implementations, the node of the graph under consideration may identify (e.g., point to memory locations of) starting and ending points of a portion of the source code that is represented by the node. Tokens that fall within that portion may be identified in various ways. In some implementations, an interval tree may be consulted to determine a count of tokens that fall within the portion of the source code that is represented by the node. This token count may then be compared to an input token constraint of the sequence-to-sequence network. For example, if the input token constraint of the sequence-to-sequence network is 512 tokens, and there are less than 512 tokens within the portion of source code represented by the node, then the tokens of the portion of source code may be identified and processed as input using the sequence-to-sequence network.

It may be the case that a first portion of source code represented by a first node of the graph may include fewer tokens than the input constraint of the sequence-to-sequence network, leaving room for additional token inputs. In some implementations, the graph may be traversed to a sibling node of the first node. A count of tokens contained in a portion of the source code represented by the sibling node may be determined and compared to the number of additional token inputs that remain (e.g., 512 minus however many tokens were in the first portion of the source code). If there are sufficient token "slots" remaining, the sibling node's portion of the source code may also be processed as input for the sequence-to-sequence network during the same iteration as the first portion of the source code represented by the first node.

If insufficient token slots remain, on the other hand, then the first node's portion of the source code may be processed during one iteration of the sequence-to-sequence model, and the sibling node's portion of the source code may be processed during another iteration of the sequence-to-sequence model. In some implementations, a second sibling node's portion of the source code may be evaluated to determine another token count. If a sum of the first sibling node's token count and the second sibling node's token count is less than the input constraint of the sequence-to-sequence network, tokens of both portions of the source code may be processed during a single iteration of the sequence-to-sequence network.

Suppose a node of the graph represents source code that includes too many tokens to be processed during a single iteration of the sequence-to-sequence network. In some such implementations, the graph may be traversed to one or more child nodes. Then, the portion of the source code represented by each child node may be evaluated as described previously to determine whether it contains fewer tokens than are permitted by the sequence-to-sequence network. If the answer is yes, then the tokens of the child node's portion of the source code may be processed as described previously using the sequence-to-sequence network, e.g., along with tokens of sibling nodes' portions of the source code that will fit into the same iteration of the sequence-to-sequence network.

Sequence-to-sequence networks may take various forms and may include various types of attention mechanisms. In some implementations, a sequence-to-sequence network may take the form of a transformer network, such as a BERT (Bidirectional Encoder Representations from Transformers) transformer and/or a GPT (Generative Pre-trained Transformer). The transformer network may be trained using one or more corpuses of documents and other data that is relevant to structured text in general, or programming language(s) in particular. These documents may include, for instance, source code examples, programming handbooks or textbooks, general programming documentation, natural language comments embedding in source code, and so forth.

Techniques described herein provided for various technical advantages. By segmenting source code into syntactically coherent segments, sequence-to-sequence models are also trained on, and thus fitted to, syntactically coherent source code. During inference, processing syntactically coherent segments of source code may result in predictions (e.g., translated source code) that are more accurate and/or more likely to compile.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients 110-1 to 110-P manage their respective code bases 112-1 to 112-P. Code knowledge system 102 may include, among other things, a code segmenter 104 that is configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Code segmenter 104 may be configured with selected aspects of the present disclosure to segment source code into syntactically coherent sequences of tokens that satisfy constraints inherent in sequence-to-sequence networks. These syntactically coherent sequences of tokens may then be processed by an inference module 105 using one or more of those sequence-to-sequence networks to aid clients 110-1 to 110-P in performing a variety of tasks related to editing, updating, re-platforming, migrating, or otherwise acting upon their code bases 112-1 to 112-P. For example, inference module 105 may be configured to use one or more sequence-to-sequence networks to translate code snippets from one programming language to another, e.g., on the fly or in batches. This may, for instance, enable a developer fluent in a first programming language to view and/or edit source code that was originally written in a second, less-familiar programming language in the first programming language. It may also significantly decrease the time and/or costs associated with migrating code bases between different programming languages.

In various implementations, code knowledge system 102 may include a machine learning ("ML" in FIG. 1) database 106 that includes data indicative of one or more trained machine learning models 106-1 to 106-N. These trained machine learning models 106-1 to 106-N may take various forms (including the sequence-to-sequence networks described herein) that will be described in more detail below, including but not limited to BERT transformers, GPT transformers, a graph-based network such as a graph neural network ("GNN"), graph attention neural network ("GANN"), or graph convolutional neural network ("GCN"), other types of sequence-to-sequence models and/or encoder-decoders, various flavors of a recurrent neural network ("RNN", e.g., long short-term memory, or "LSTM", gated recurrent units, or "GRU", etc.), and any other type of machine learning model that may be applied to facilitate selected aspects of the present disclosure.

In some implementations, code knowledge system 102 may also have access to one or more programming-language-specific corpuses 108-1 to 108-M. In some implementations, these programming-language-specific corpuses 108-1 to 108-M may be used, for instance, to train one or more of the machine learning models 106-1 to 106-N. In some implementations, the programming-language-specific corpuses 108-1 to 108-M may include examples of source code (e.g., entire code bases, libraries, etc.), inline comments, textual metadata associated with source code (e.g., commits), documentation such as textbooks and programming manuals, programming language-specific discussion threads, presentations, academic papers, and so forth.

In some implementations, a client 110 that wishes to enable manipulation of its code base 112 may establish a relationship with an entity (not depicted in FIG. 1) that hosts code knowledge system 102. When a developer wishes to view/edit a source code snippet of the entity's code base 112 but is unfamiliar with the native programming language, inference module 105 may provide one or more versions of the source code snippet that is translated to a target programming language preferred by the developer. In some such implementations, inference module 105 may generate the translated source code snippet on the fly, e.g., in real time. In other implementations, inference module 105 may operate, e.g., in a batch mode, to preemptively translate all or selection portions of an entity's code base 112 into a targeted programming language. In some implementations in which the developer then edits the translated source code snippet, the edited version may be translated back into the native programming language or left in the new, target programming language, assuming other necessary infrastructure is in place.

Figure 2:
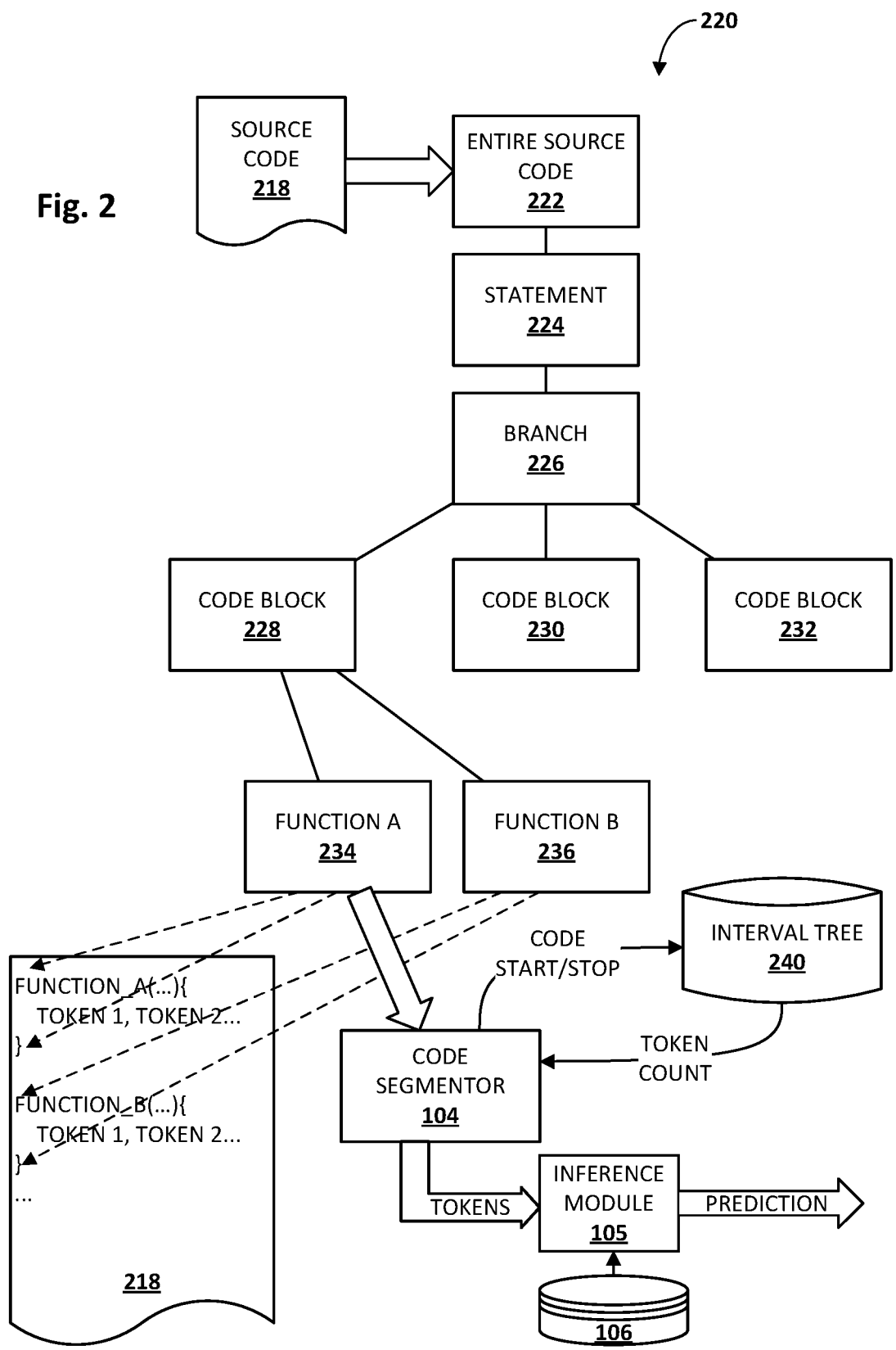
FIG. 2 schematically depicts an example of how graphs may be used to segment source code into syntactically coherent segments, in accordance with various implementations.

FIG. 2 schematically depicts an example of how graphs may be used by code segmenter 104 to segment source code into syntactically coherent segments, in accordance with various implementations. Starting at the top, source code 218 (e.g., an entire source code file or multiple source code files, or entire source code functions) may be processed, e.g., by code segmenter 104 and/or by a separate component (e.g., a compiler) to generate a graph 220 that represents tokens of source code 218 and logical relationships between those tokens. In this example, graph 220 takes the form of an AST, but this is not meant to be limiting.

Graph 220 includes a top node 222 that represents the entire source code, a first child node 224 that represents a statement contained in source code 218, and a second child node 226 represents a branch that stems from the statement contained in first child node 224. The branch node 226 has three children nodes 228-232, each representing a distinct block of code. And one of those nodes 228 includes two leaf nodes, leaf 234 corresponding to FUNCTION A and leaf 236 corresponding to FUNCTION B. These nodes are merely for illustrative purposes and are not meant to be limiting in any way.

In various implementations, each node of graph 220 may identify (e.g., point to memory locations of) starting and ending points of a portion of source code 218 that is represented by the node. For example, and as demonstrated by the dashed arrows in FIG. 2, node 234 points to a beginning and end of FUNCTION A. Similarly, node 236 points to a beginning and end of FUNCTION B. Thus, code segmenter 104 can determine which portions of source code 218 correspond to which nodes.

However, knowing starting and ending points within source code 218 may not directly indicate how many tokens are contained in the portion of source code 218 that is represented by a particular node. And various sequence-to-sequence networks may be subject to input constraints in terms of a limited number of tokens. Accordingly, in various implementations, code segmenter 104 may be configured to consult an interval tree 240 to determine a token count for a portion of source code associated with a particular node of graph 220. As shown in FIG. 2, code segmenter 104 may use source code start/stop points to consult interval tree 240.

Based on those start/stop points, interval tree 240 may reveal a token count to code segmenter 104.

Code segmenter 104 may determine whether the token count satisfies input constraint(s) of a sequence-to-sequence network that is to be applied by inference module 105 downstream. For example, a BERT transformer may be configured to process 512 tokens at a time. If the token count is less than 512, then inference module 105 may apply the BERT transformer to all the tokens to generate a prediction. However, if the token count is greater than 512, code segmenter 104 may traverse graph 220 further, e.g., to children nodes, until code segmenter 104 can find a node with less than 512 tokens.

Continuing with the example of FIG. 2, and starting at the top, top node 222 of graph 220 may represent the entire source code, and it may be determined, e.g., using interval tree 240, that the entire source code contains more than 512 tokens. Accordingly, code segmenter 104 may traverse down graph 220 to node 224. Assuming the portion of source code 218 that is represented by node 224 is greater than 512, code segmenter 104 may continue to traverse through graph 220. In this example, it can be assumed that nodes 226 and 228 also represent portions of source code 218 that each contain more than 512 tokens.

When code segmenter 104 reaches node 234, however, it may be determined that the portion of source code 218 represented by FUNCTION A contains less than 512 tokens. If that is the case, those tokens may be segmented into a sequence to be processed, e.g., by inference module 105 using a sequence-to-sequence network. Next, code segmenter 104 may determine how many additional token inputs remain available in the sequence-to-sequence network. For example, if FUNCTION A include 256 tokens, then there remain 256 tokens for input. Code segmenter 104 may then determine a token count of node 236, which represents FUNCTION B in source code 218. If the token count of FUNCTION B is less than 256, those tokens may be added to the sequence of tokens that are to be processed by inference module 105 using the sequence-to-sequence network.

However, if FUNCTION B has more than 256 tokens, then the remaining inputs of the sequence-to-sequence network may, for instance, be filled with null values, zeroes, etc. FUNCTION B may then be processed, e.g., by inference module 105, during a next iteration of the sequence-to-sequence model. If code segmenter 104 determines FUNCTION B contains more than 512 tokens, then code segmenter 104 may traverse from node 236 to children node(s) (not depicted in FIG. 2) until a child (or grandchild) node is discovered that has fewer than 512 tokens. Once a node is discovered having less than 512 tokens, code segmenter 104 may provide those tokens as input to inference module 105 as described previously.

Figure 3:
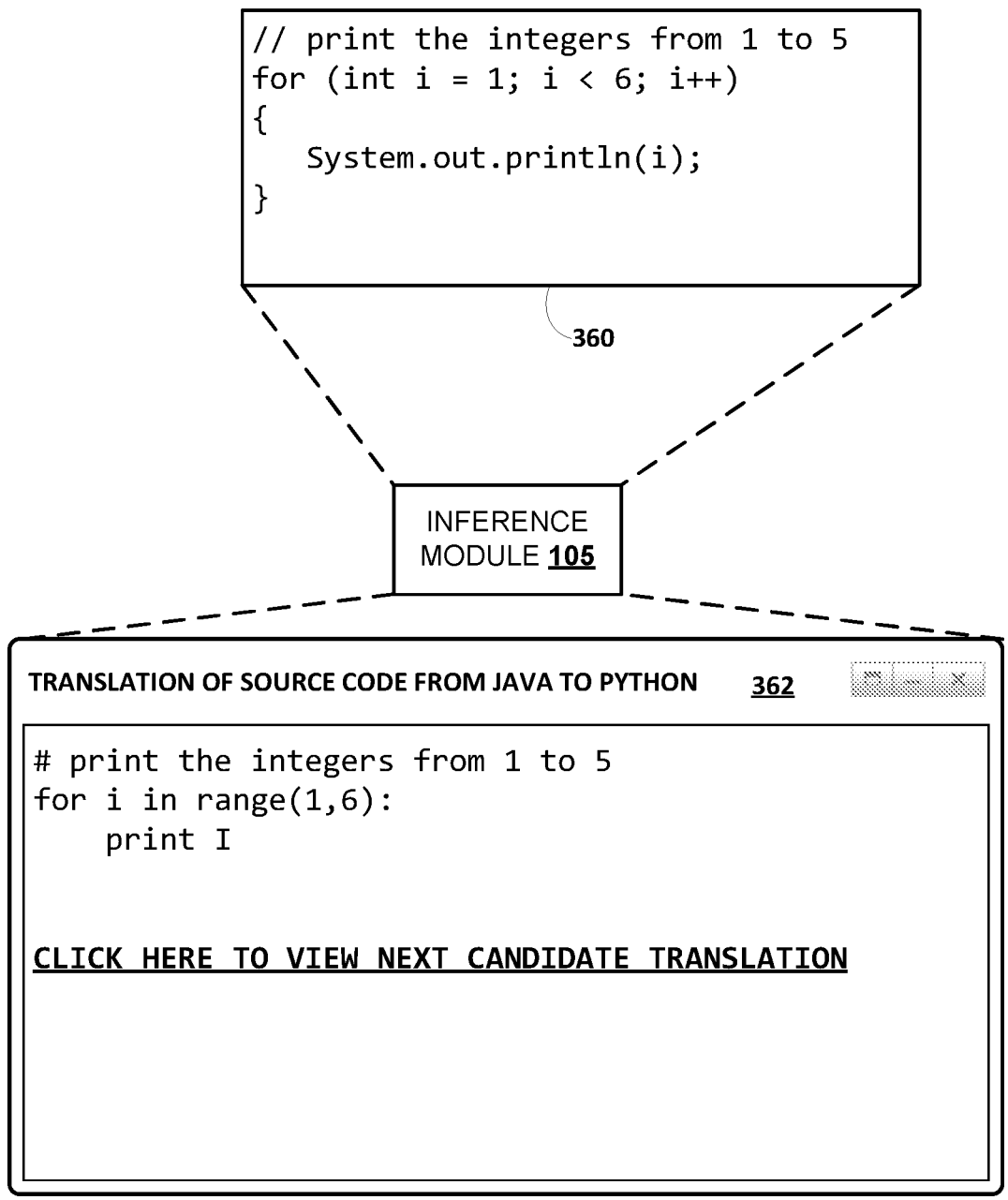
FIG. 3 depicts an example application of techniques described herein, in accordance with various implementations.

FIG. 3 depicts an example scenario in which a code snippet written in one programming language may be translated to another programming language. In this example, the base source code snippet 360 is written in Java and prints the integers one to five. At bottom, a graphical user interface ("GUI") 362 is depicted that may be presented to a developer who is unfamiliar with Java, but who has expertise in another programming language. In this example, the code snippet 360 written in Java is first segmented into a syntactically coherent sequence(s) of tokens by code segmenter 104. Then, inference module 105 processes the syntactically coherent sequence(s) of tokens to generate translated Python code that is rendered as part of GUI 362. In this way, the developer operating GUI 362 may view the source code in a programming language with which he or she is more familiar. In some cases, the developer may be able to edit the translated source code. In some such implementations, the edits made by the developer may be translated back to Java before being stored and/or more permanently incorporated into the code base. In other implementations, the edited Python code may be incorporated into the code base.

In some implementations, the original source code 360 may be sent to code knowledge system 102 for segmentation by code segmenter 104 and translation by inference module 105 prior to being sent to the computing device (not depicted) that renders GUI 362. In other implementations, GUI 362 may be part of a software development application that performs the programming language translation locally, e.g., using a plug-in or built-in functionality. The scenario of FIG. 3 is for illustrative purposes only. Source code may be translated between programming languages using techniques described herein for any number of applications.

For example, suppose a first user who is trained in a base programming language sends a source code snippet in the base programming language to a second user, e.g., as an attachment or in the body of an email. In some implementations, the source code in the based programming language may be translated into a target programming language en route to the second user, e.g., by inference module 105. Additionally or alternatively, in some implementations, the second user's email application (or an email server that stores emails of the second user) may have a plugin configured with selected aspects of the present disclosure.

In some implementations, a single user may operate a software development application to view multiple different source code snippets written in multiple different programming languages that are unfamiliar to the user. In some such examples, multiple respective translation models may be used to translate the source code snippets from the multiple different programming languages to a language (or languages) that are better understood to the user.

In some implementations, techniques described herein may be used to automatically convert source code written in one programming language into source code in another programming language, without necessarily presenting translated source code to users as described previously. For example, a company may decide to re-platform an existing code base 112 to a new programming language, e.g., to obtain new functionality and/or technical benefits (e.g., security features, processing speed features, etc.) that were unavailable with the original programming language. Such a company may be able to deploy techniques described herein, or request that an entity associated with code knowledge system 102 deploy techniques described herein, to automatically convert all or a portion of a code base 112 from one programming language to another.

It may be desirable to present a programmer with multiple different candidate translations of a source code snippet, e.g., so that the programmer can use their judgment to determine which candidate is best. These multiple different candidate translations may be determined, for instance, using techniques such as beam searching performed as part of a decoding process associated with a transformer network. Accordingly, in FIG. 3, a selectable link is presented ("CLICK HERE TO VIEW NEXT CANDIDATE TRANSLATION") that a user can select to see an alternative translation of the original source code snippet. In some implementations, these candidate translations may be presented to the user in a ranked order. This ranked order may be determined in various ways, such as by how many (or few) errors or warnings are raised when attempts are made to parse and/or compile the candidate translations (e.g., in the background without the user being aware). For example, various types of analysis associated with compiling, such as lexical analysis, syntax analysis, semantic analysis, and so forth, may be applied to each candidate translation to determine its score (which may be inversely proportional to the number of errors or warnings generated). The candidates with the "best" scores may be presented to the programmer first. In some implementations, candidate translations may be presented (or at least made available for presentation) until various criteria are met, such as a candidate no longer being capable of being compiled.

While translation is the application depicted in FIG. 3, techniques described herein for generating syntactically-coherent sequences of source code tokens may be used for a variety of other tasks. For example, instead of translating between programming languages, the sequence-to-sequence network may be trained to generate natural language summarizations of source code snippets. As another example, the sequence-to-sequence network may be trained to identify and/or automatically bugs or potential bugs in source code. In some cases, the sequence-to-sequence network may be trained to generate source code from a natural language description. In such a case, when the sequence-to-sequence network is initially trained, training instances of source code may be segmented as described herein before being processed using the sequence-to-sequence network.

Figure 4:
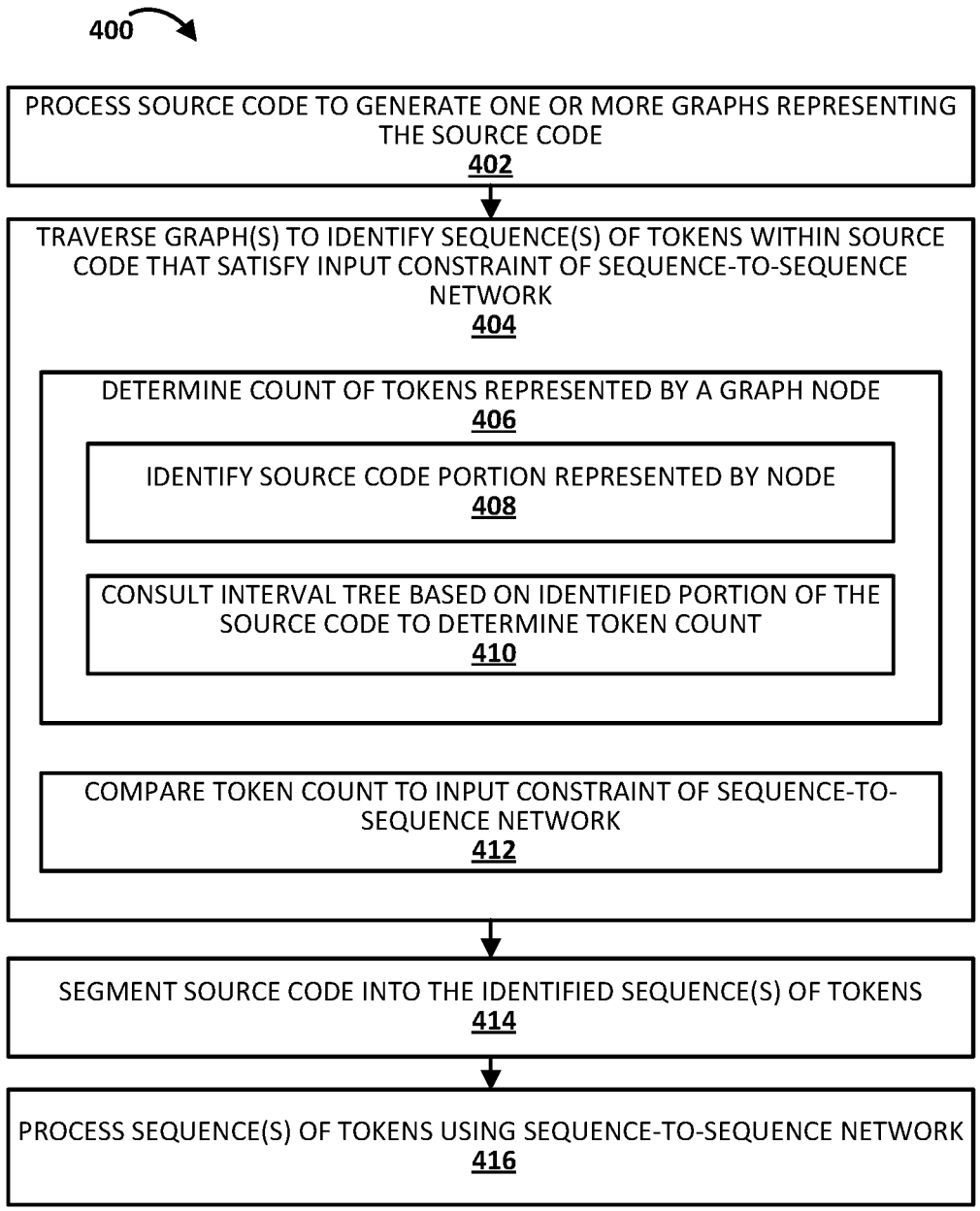
FIG. 4 depicts a flowchart illustrating an example method for practicing selected aspects of the present disclosure.

FIG. 4 is a flowchart illustrating an example method 400 of assembling syntactically coherent sequences of source code tokens, in accordance with various implementations. For convenience, the operations of the flow chart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted or added.

At block 402, the system, e.g., by way of code segmenter 104, may process source code (e.g., 218) to generate one or more graphs (e.g., 220) representing the source code. For example, code segmenter 104 may be configured with compiler functionality to convert source code 218 into an AST or CFG.

At block 404, the system, e.g., by way of code segmenter 104, may traverse one or more of the graphs to identify one or more sequences of tokens within the source code that satisfy an input constraint (e.g., 512 tokens) of a sequence-to-sequence network (e.g., a BERT transformer, a large language model, etc.). For example, at block 406, code segmenter 104 may determine a count of tokens represented by a node of the graph. In some implementations, this may include, at block 408, identifying a source code portion that is represented by the node, and at block 410, consulting an interval tree (e.g., 240) based on the identified portion of source code to determine the token count. At block 412, the token count may be compared, e.g., by code segmenter 104, to the input constraint (e.g., 512 tokens) of the sequence-to-sequence network.

If the token count satisfies the input constraint(s) of the sequence-to-sequence network, at block 414, the system, e.g., by way of code segmenter 104, may segment the source code into the identified one or more sequences of tokens. For example, code segmenter 104 may populate a contiguous portion of memory with the sequence of tokens, and then send a pointer to inference module 105 that points to the first token in the sequence. Alternatively, the sequence of tokens may be stored in non-contiguous memory locations, e.g., as a linked list.

At block 416, the system, e.g., by way of inference module 105, may process the one or more sequences of tokens using the sequence-to-sequence network. For example, inference module 105 may apply the sequence of tokens as inputs across a BERT transformer or other similar sequence-to-sequence network to generate output.

The source code segmenting described herein may be used for a variety of different tasks. Depending on the application, the output generated based on the sequence-to-sequence network may take the form of a translation of original source code into another programming language, a different version of the same programming language, a natural language summarization of the source code's functionality, an identification of potential errors (syntactic or semantic) in the input source code, etc. For example, in some implementations, the output generated based on the sequence-to-sequence network may identify/fix potential bugs in the source code. In other implementations, the output generated based on the sequence-to-sequence network may identify other portions of other source code that are similar to the input source code.

Figure 5:
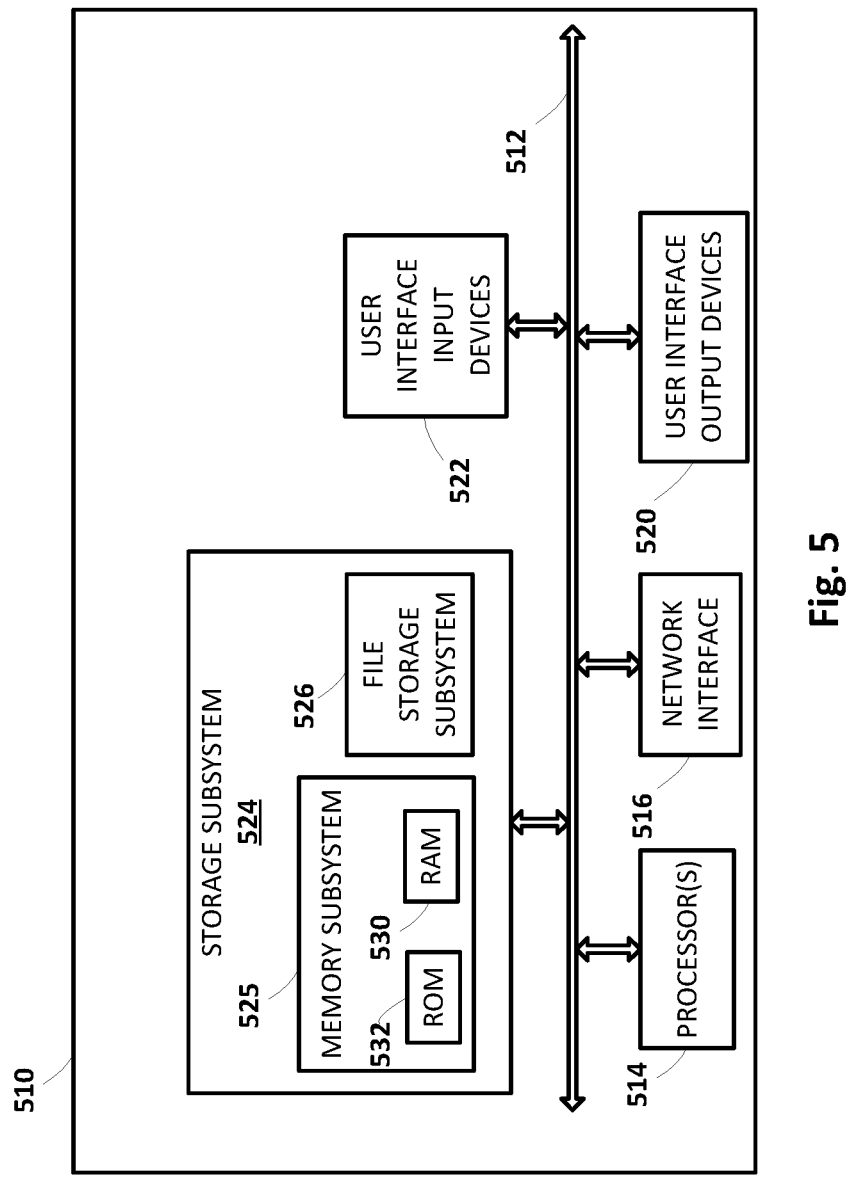
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4, as well as to implement various components depicted in FIG. 1 or 2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors and comprising:
    processing source code to generate one or more graphs representing the source code;
    traversing one or more of the graphs to identify one or more sequences of tokens within the source code that satisfy an input constraint of a trained machine learning model comprising a transformer network with an attention mechanism, wherein the input constraint comprises a limit on how many tokens can be processed during a single iteration of the transformer network;
    segmenting the source code into the identified one or more sequences of tokens; and
    processing the one or more sequences of tokens using the transformer network.

2. The method of claim 1, wherein the one or more graphs include an abstract syntax tree (AST) representing the source code.

3. The method of claim 1, wherein the one or more graphs include at least one of a data flow graph (DFG) or a control flow graph (CFG) representing the source code.

4. The method of claim 1, wherein the traversing one or more of the graphs to identify the one or more sequences of tokens includes:
    determining a count of tokens represented by a node of one or more of the graphs; and
    comparing the count of tokens to the input constraint of the transformer network.

5. The method of claim 4, wherein determining the count includes:
    identifying a portion of the source code represented by the node; and
    consulting an interval tree based on the identified portion of the source code to determine the count.

6. The method of claim 4, wherein the node is a first node, the count is a first count, and the method further comprises:
    in response to a determination that the first count of tokens satisfies the input constraint of the transformer network, determining a second count of tokens represented by a second node of one or more of the graphs, and comparing the second count of tokens to the input constraint of the transformer network.

7. The method of claim 6, wherein the second node comprises a sibling node of the first node.

8. The method of claim 4, wherein the node is a first node, the count is a first count, and the method further comprises:
    in response to a determination that the first count of tokens fails to satisfy the input constraint of the transformer network, determining a second count of tokens represented by a child node of the first node, and comparing the second count of tokens to the input constraint of the transformer network.

9. A system comprising one or more processors and memory storing instructions that, in response to execution by the one or more processors, cause the one or more processors to:
    process source code to generate one or more graphs representing the source code;
    traverse one or more of the graphs to identify one or more sequences of tokens within the source code that satisfy an input constraint of a trained machine learning model comprising a transformer network with an attention mechanism, wherein the input constraint comprises a limit on how many tokens can be processed during a single iteration of the transformer network;
    segment the source code into the identified one or more sequences of tokens; and
    process the one or more sequences of tokens using the transformer network.

10. The system of claim 9, wherein the one or more graphs include an abstract syntax tree (AST) representing the source code.

11. The system of claim 9, wherein the one or more graphs include at least one of a data flow graph (DFG) or a control flow graph (CFG) representing the source code.

12. The system of claim 9, wherein the instructions to traverse one or more of the graphs to identify the one or more sequences of tokens include instructions to:

determine a count of tokens represented by a node of one or more of the graphs; and compare the count of tokens to the input constraint of the transformer network.

13. The system of claim 12, wherein the instructions to determine the count include instructions to:

identify a portion of the source code represented by the node; and consult an interval tree based on the identified portion of the source code to determine the count.

14. The system of claim 12, wherein the node is a first node, the count is a first count, and the system further comprises instructions to:

in response to a determination that the first count of tokens satisfies the input constraint of the transformer network, determine a second count of tokens represented by a second node of one or more of the graphs, and compare the second count of tokens to the input constraint of the transformer network.

15. The system of claim 14, wherein the second node comprises a sibling node of the first node.

16. The system of claim 12, wherein the node is a first node, the count is a first count, and the system further comprises instructions to:

in response to a determination that the first count of tokens fails to satisfy the input constraint of the transformer network, determine a second count of tokens represented by a child node of the first node, and compare the second count of tokens to the input constraint of the transformer network.

17. At least one non-transitory computer-readable medium comprising instructions that, when executed by one or more processors, cause the one or more processors to:

process source code to generate one or more graphs representing the source code;

traverse one or more of the graphs to identify one or more sequences of tokens within the source code that satisfy an input constraint of a trained machine learning model comprising a transformer network with an attention mechanism, wherein the input constraint comprises a limit on how many tokens can be processed during a single iteration of the transformer network;

segment the source code into the identified one or more sequences of tokens; and process the one or more sequences of tokens using the transformer network.

18. The at least one non-transitory computer-readable medium of claim 9, wherein the one or more graphs include at least one of a data flow graph (DFG) or a control flow graph (CFG) representing the source code.

* * * * *